(12) United States Patent
Stibel et al.

(10) Patent No.: US 8,762,473 B2
(45) Date of Patent: *Jun. 24, 2014

(54) METHOD AND SYSTEM FOR DIRECTLY TARGETING AND BLASTING MESSAGES TO AUTOMATICALLY IDENTIFIED ENTITIES ON SOCIAL MEDIA

(71) Applicant: Credibility Corp., Malibu, CA (US)

(72) Inventors: Jeffrey M. Stibel, Malibu, CA (US); Aaron B. Stibel, Malibu, CA (US)

(73) Assignee: Credibility Corp., Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/098,427

(22) Filed: Dec. 5, 2013

(65) Prior Publication Data

US 2014/0095640 A1    Apr. 3, 2014

Related U.S. Application Data

(63) Continuation of application No. 13/300,368, filed on Nov. 18, 2011, now Pat. No. 8,606,869.

(60) Provisional application No. 61/546,501, filed on Oct. 12, 2011.

(51) Int. Cl.

| | | |
|---|---|---|
| *G06F 15/16* | (2006.01) |
| *H04L 12/58* | (2006.01) |
| *H04M 3/42* | (2006.01) |
| *H04M 1/725* | (2006.01) |
| *H04N 21/4786* | (2011.01) |
| *H04N 21/4788* | (2011.01) |
| *G06Q 30/02* | (2012.01) |
| *G06Q 50/00* | (2012.01) |

(52) U.S. Cl.
CPC ............ *H04L 12/585* (2013.01); *H04L 12/588* (2013.01); *H04M 3/42382* (2013.01); *H04M 1/72552* (2013.01); *H04N 21/4786* (2013.01); *H04N 21/4788* (2013.01); *G06Q 30/0201* (2013.01); *G06Q 30/0255* (2013.01); *G06Q 50/01* (2013.01); *Y10S 707/9994* (2013.01); *Y10S 707/99933* (2013.01); *Y10S 707/99941* (2013.01); *Y10S 707/99931* (2013.01); *Y10S 707/99935* (2013.01); *Y10S 707/99937* (2013.01); *Y10S 707/99945* (2013.01)
USPC ........... 709/206; 709/200; 709/201; 709/202; 709/203; 709/204; 709/205; 709/207; 709/217; 709/220; 709/221; 709/223; 709/224; 709/226; 709/228; 709/245; 370/352; 370/353; 370/466; 370/389; 370/392; 370/400; 370/412; 455/414.1; 455/412.1; 455/412.2; 455/414.4; 705/14.69; 707/E17.014; 707/999.01; 707/999.003; 707/999.1; 707/607; 707/999.001; 707/999.005; 707/999.007; 707/999.104

(58) Field of Classification Search
CPC ..................... H04M 3/42382; H04M 1/72552; H04M 1/72555; H04N 21/4786; H04N 21/8586; H04N 21/4788; H04L 12/585; H04L 12/588; G06Q 30/0255; G06Q 30/0273; G06Q 50/01; G06Q 30/0201; Y10S 707/99937
USPC ......... 709/202, 224, 220, 223, 203, 205, 217, 709/201, 200, 204, 207, 221, 226, 228, 709/245; 455/414.1, 412.1, 412.2, 414.4; 370/352, 353, 466, 389, 392, 400, 412; 707/E17.014, 999.01, 999.003, 999.1, 707/607, 999.001, 999.005, 999.007, 707/999.104; 705/14.69
See application file for complete search history.

(56) References Cited

U.S. PATENT DOCUMENTS

| | | | | |
|---|---|---|---|---|
| 6,865,715 | B2 * | 3/2005 | Uchino et al. | 715/277 |
| 7,886,000 | B1 * | 2/2011 | Polis et al. | 709/203 |
| 8,001,249 | B2 * | 8/2011 | Murphy et al. | 709/227 |
| 2001/0018698 | A1 * | 8/2001 | Uchino et al. | 707/533 |
| 2003/0060240 | A1 * | 3/2003 | Graham et al. | 455/566 |
| 2004/0243582 | A1 * | 12/2004 | Sasaki et al. | 707/9 |
| 2007/0288636 | A1 * | 12/2007 | Rogers et al. | 709/226 |
| 2008/0040437 | A1 * | 2/2008 | Agarwal et al. | 709/206 |
| 2008/0275864 | A1 * | 11/2008 | Kim et al. | 707/5 |
| 2009/0017794 | A1 * | 1/2009 | Wilson | 455/414.1 |

| | | | |
|---|---|---|---|
| 2009/0234922 A1* | 9/2009 | Appelman | 709/206 |
| 2010/0077048 A1* | 3/2010 | Czyzewicz et al. | 709/206 |
| 2010/0255861 A1 | 10/2010 | Raviv et al. | |
| 2010/0312769 A1* | 12/2010 | Bailey et al. | 707/740 |
| 2011/0004662 A1* | 1/2011 | Dodsworth | 709/206 |
| 2011/0010182 A1* | 1/2011 | Turski et al. | 705/1.1 |
| 2011/0022669 A1* | 1/2011 | Pascoe et al. | 709/206 |
| 2011/0040617 A1* | 2/2011 | Moonka et al. | 705/14.46 |
| 2011/0047245 A1* | 2/2011 | Abramson et al. | 709/219 |
| 2011/0055721 A1* | 3/2011 | Jain et al. | 715/748 |
| 2011/0087705 A1* | 4/2011 | Swink et al. | 707/800 |
| 2011/0105095 A1* | 5/2011 | Kedefors et al. | 455/418 |
| 2011/0125697 A1* | 5/2011 | Erhart et al. | 706/47 |
| 2011/0125770 A1* | 5/2011 | Battestini et al. | 707/758 |
| 2011/0145348 A1* | 6/2011 | Benyamin et al. | 709/206 |
| 2011/0145350 A1* | 6/2011 | Batel et al. | 709/206 |
| 2011/0151844 A1* | 6/2011 | Graham et al. | 455/414.1 |
| 2011/0161444 A1 | 6/2011 | Chauhan | |
| 2011/0179378 A1* | 7/2011 | Wheeler et al. | 715/780 |
| 2011/0185354 A1* | 7/2011 | Tanner et al. | 717/178 |
| 2011/0208822 A1* | 8/2011 | Rathod | 709/206 |
| 2011/0307340 A1* | 12/2011 | Benmbarek | 705/14.73 |
| 2011/0307397 A1* | 12/2011 | Benmbarek | 705/319 |
| 2012/0001919 A1* | 1/2012 | Lumer | 345/440 |
| 2012/0028718 A1* | 2/2012 | Barclay et al. | 463/42 |
| 2012/0059884 A1* | 3/2012 | Rothschild | 709/206 |
| 2012/0330701 A1* | 12/2012 | Hyder et al. | 705/7.11 |
| 2013/0067035 A1* | 3/2013 | Amanat et al. | 709/219 |
| 2013/0133038 A1* | 5/2013 | DeLuca et al. | 726/4 |
| 2013/0273976 A1* | 10/2013 | Rao et al. | 455/563 |

* cited by examiner

*Primary Examiner* — Saket K Daftuar

(74) *Attorney, Agent, or Firm* — Los Angeles Patent Group; Arman Katiraei

(57) ABSTRACT

Some embodiments provide a communication tool that directly sends messages to accounts of different entities across different social media sites by automatically identifying and associating the accounts of the entities when the entities are referenced in the contents of the messages. Such identification and association is performed without the message originator manually specifying the accounts as intended recipients for the messages. The communication tool also automatically sends messages to different social media accounts of the message originator. The communication tool also blasts messages to an information aggregator that aggregates messages to develop a database from which the messages that target a particular entity can be presented irrespective of whether the particular entity has registered an account with any social media site, irrespective of which social media site the messages are originally destined for, and irrespective of whether a recipient is explicitly specified for the messages by the message originator.

19 Claims, 10 Drawing Sheets

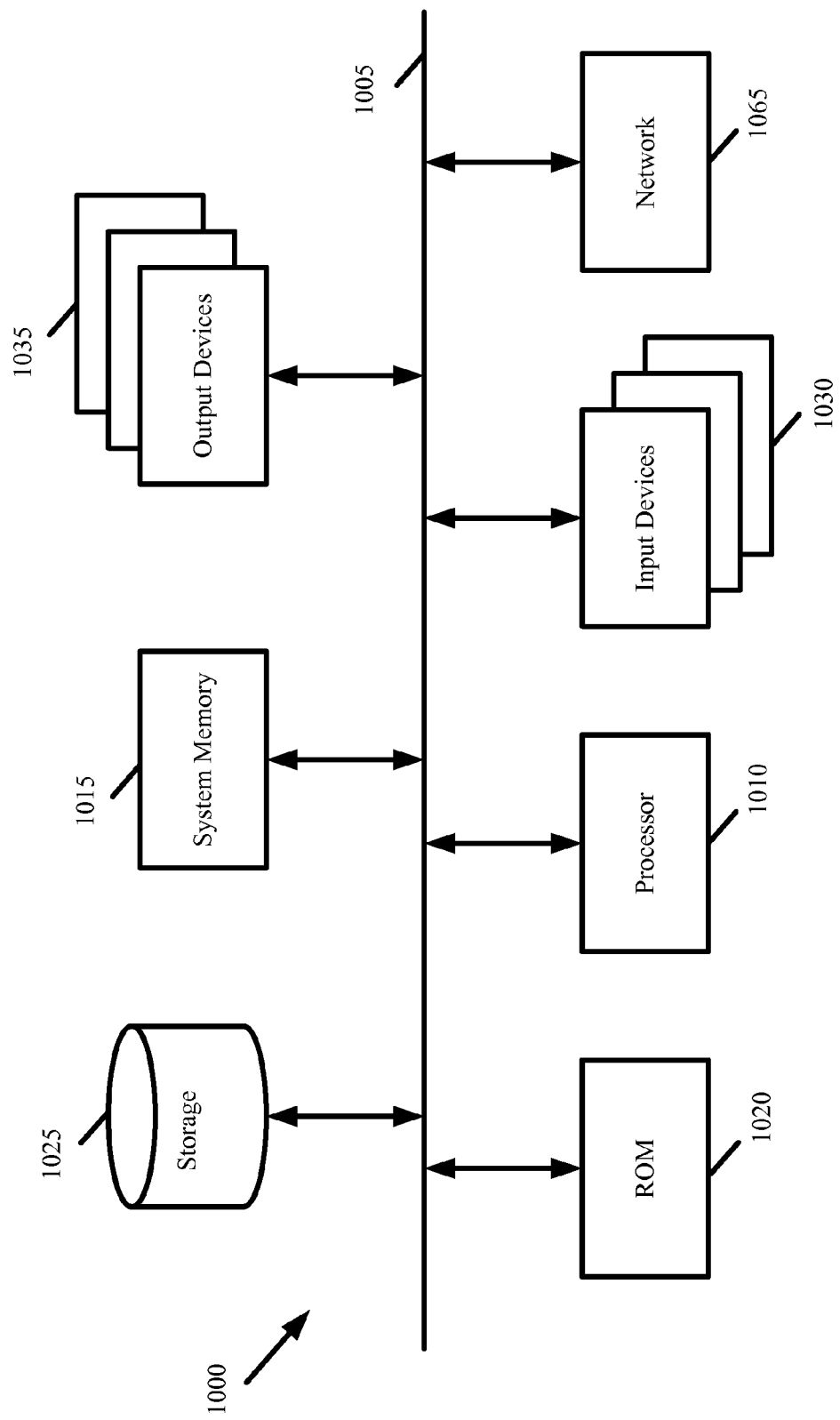

METHOD AND SYSTEM FOR DIRECTLY TARGETING AND BLASTING MESSAGES TO AUTOMATICALLY IDENTIFIED ENTITIES ON SOCIAL MEDIA

CLAIM OF BENEFIT TO RELATED APPLICATIONS

This application is a continuation of U.S. non-provisional application Ser. No. 13/300,368, entitled ""Method and System for Directly Targeting and Blasting Messages to Automatically Identified Entities on Social Media", filed Nov. 18, 2011 now issued U.S. Pat. No. 8,606,869 which claims the benefit of U.S. provisional application 61/546,501, entitled "Method and System for Directly Targeting and Blasting Messages to Automatically Identified Entities on Social Media", filed Oct. 12, 2011. The contents of application Ser. Nos. 13/300,368 and 61/546,501 are hereby incorporated by reference.

TECHNICAL FIELD

The present invention pertains to social media and, more specifically, for improving message dissemination in social media.

BACKGROUND

Social media sites such as Twitter, Facebook, Google+, Yelp, CitySearch, LinkedIn, and the like have brought about means with which an entity can easily and at anytime communicate with a broad audience. The draw to communicating through social media is the ability for one entity to communicate with any of the other millions of individual entities and business entities that have registered accounts with a particular social media site.

In some social media sites, communication occurs by way of a message originator entering and posting a message to a site that is associated with the account that the message originator has registered at a particular social media site. By accessing the message originator site at the particular social media site, "friends" or entities that have a preexisting relationship with the message originator can view the posted messages. Some social media sites allow the postings to be made public such that any entity that has an account at the particular social media site can access the site of the message originator to view the posted messages of the message originator. This however is a poor utilization of the messaging capabilities of social media, because viewers that are interested in the messages of the message originator have to actively seek out the messages that are posted by the message originator. In other words, a viewer first logs into its own account at the particular social media site and then the viewer navigates to the site of the message originator before being able to view the posted messages. A further issue with this form of communication is that entities that are the targets or subjects of various posted messages have no idea of what is said about them by others. Further still, entities that are the targets or subjects of various messages may be unable to view the messages when the messages are restricted to viewing by "friends" or entities that have a preexisting relationship with the message originator. Lastly, when one is interested in learning what others have said about a particular entity, there is no central place where messages that reference the particular entity can be found as the messages are instead posted on the sites of the message originators and not on a site pertaining to the particular entity.

To overcome some of these obstacles, some social media sites provide communication that occurs by way of a message originator entering and blasting a message to a set of specified recipients. This is typically accomplished by use of email messages, chat, or instant messages. This method of communication also has various shortcomings and similarly fails to realize the full messaging potential of social media. Specifically, blasting messages to one's "friends" or entities for which a preexisting relationship already exists, is a poor conduit for sharing one's experiences with others that one does not have a preexisting relationship with. For example, blasting the message "I love Acme restaurant" to one's friends would cause that message to only be read by those friends. A random entity wanting to know what others think about Acme restaurant would be unable to see that message and therefore the experience would not be shared in social media. Similarly, the entity representing Acme restaurant would be unaware that such a positive message was posted and therefore would have a difficult time trying to ascertain how it is perceived by its peers, customers, etc.

When blasting messages to recipients, the message originator can make the effort to post the message to a site of the entity that is the subject of, target of, or referenced in the message. Continuing the example above, some social media sites allow the message originator to blast the message "I love Acme restaurant" to a site that is associated with an account that Acme restaurant has registered at the social media site used by the message originator. In this manner, anyone interested in learning about Acme restaurant can navigate to the account/site of Acme restaurant at the social media site and see messages that other entities have posted about Acme restaurant. To communicate in this manner, the message originator is required to manually specify Acme restaurant as a recipient for the message by entering the username, handle, or other identifier for the Acme restaurant social media account as the intended destination for the message. While this is accepted practice for most forms of online communication, this practice is inconvenient and inefficient especially when the message originator does not have a preexisting online relationship with one of the recipients. The message originator can still send messages to that recipient, however the message originator would have to search for an account of that recipient on the social media site before being able to blast a message to that recipient. This is a particular issue with review sites such as Yelp. To post a review about a business entity on Yelp, one has to (1) login to his/her Yelp account, (2) identify an account for that business entity on Yelp, (3) access the account of the business entity if it exists, and (4) post the message to the account of the business entity. The inconvenience of having to manually search for and identify a recipient when a message is to be directed to that recipient inhibits the use of social media as a truly convenient platform with which an entity can share its experiences with another entity when no prior relationship exists between the two on the social media site even though the two may have had a real world interaction.

A further obstacle to blasting a message to a particular recipient at a particular social media site is that the particular recipient must have an online presence at the particular social media site in order for the message to be blasted to that particular recipient. When the message originator has an account registered at a first social media site (e.g., Facebook) and the recipient has an account registered at a second social media set (e.g., Google+), the message originator cannot post a message to an account or site of the recipient because the recipient has no presence at the first social media site and because inter-social media site communication is typically not supported because of different messaging protocols, formats, interfaces, etc. It also may be the case that the target or subject of a message has no social media presence whatsoever (i.e., has not registered an account with any social media site). In such instances, one cannot post a message to the site or account of the target recipient and entities interested in learning about the experiences that others have had with the target recipient have no central place to view such messages.

In view of the foregoing, it should be apparent that current means of communicating through social media are poor conduits (1) for sharing experiences with others that one does not have preexisting relationship with and (2) for informing an entity that is a target or subject of a message about the experiences that one has had with that entity. Accordingly, it would be advantageous to simplify and improve the process with which a message originator can share its experiences about a specific entity that is the target or subject of the experience. To that end, there is a need to be able to automatically identify accounts of entities that are referenced in the body or contents of messages entered by a message originator and to automatically blast messages to those accounts. There is further a need to perform such automatic message blasting irrespective of whether the target entity has an account registered at any particular social media site.

SUMMARY OF THE INVENTION

It is an object of the present invention to define systems, methods, and computer software products to directly target and blast messages to entities that are automatically identified from the contents of the messages and that may or may not have a presence on any of several social media sites. It is further an object to blast messages to different accounts that a message originator has registered at different social media sites without the message originator having to access and post the messages to each account individually. It is further an object to blast messages to an information aggregator that aggregates messages in order to develop a database from which the messages that target a particular entity can be presented irrespective of whether the particular entity has created or registered an account with any social media site, irrespective of which social media site the messages may have originally been destined for, and irrespective of whether a recipient is explicitly specified for the message by the message originator.

These and other objects are provided by a communication tool. The communication tool may be embodied as a platform independent software application that executes on any network enabled device such as a smartphone, computer, tablet, etc.

The communication tool includes a message interface, a message processor, and a dissemination engine. At the message interface, a message originator enters input that forms the message to be sent. A keyboard (e.g., physical or virtual), touchscreen, voice digitizer, or other peripheral can be used to enter the message into the message interface.

As a message is entered to the message interface, the message processor processes different fragments of the message to automatically identify one or more entities that are referenced in the body of the message. In some embodiments, the message processor compares a set of alphanumeric characters from different message fragments against names and other identification information of entities that are stored to an entity database of an information aggregator. The comparison determines whether the set of alphanumeric characters from a message fragment matches to the name or other identification information of a particular entity by a specified threshold degree. When a match is found, the identification information for the matched entity is retrieved from the entity database. In some embodiments, the message processor filters the message fragments to optimize the automated entity identification. Filtering may include performing matching for message fragments that satisfy a set of grammar rules. Filtering may include supplementing the message fragment with other information that is available to the communication tool at the time the message is entered to the message interface. For example, the communication tool interfaces with the user device to obtain geolocation information to assist in accurately and efficiently determining the target entity by identifying entities that match to the message fragment and that are located in the same region as the geolocation information.

After identifying entities from the message fragments, the message processor of some embodiments obtains the accounts that the identified entities have registered at various social media sites. In some embodiments, the account information is present in the entity database such that when a particular entity is identified from the entity database, the record associated with that particular entity includes the accounts that the particular entity has registered at one or more social media sites. In some embodiments, the message processor dynamically obtains the accounts of a particular identified entity based on identification information for the identified entity that is obtained from the entity database. The identification information includes the proper name, mailing address, email address, URL, telephone number, etc. of the particular entity. The identification information is then used to formulate queries at a set of social media sites and the queries are used to obtain accounts (e.g., handles, usernames, hyperlinks, etc.) that match to the identification information by a specified threshold. The obtained accounts (i.e., the username, handles, or other identifier associated with the account) are then linked to the message that is entered into the message interface. In some embodiments, the identification information from the entity database is also linked to the message.

In addition to or instead of linking accounts for entities that are identified from the message, the message processor links one or more accounts of the message originator to the message. The communication tool allows the message originator to specify which of its accounts should be linked to the message such that the message is posted to those accounts. In this manner, the communication tool can blast the message to one or more accounts that the message originator has registered at various social media sites without manually having to login, enter, and disseminate the message at each of the social media sites separately. Such account information is provided by the message originator prior to composition of the message.

When the message originator selects to send the message, the dissemination engine sends the message to the accounts that were automatically identified and linked to the message. As described above, these accounts may include accounts for various entities that were identified from the contents of the message and/or accounts that the message originator has registered at various social media sites. In this manner, the message originator can simply compose a message using the communication tool and send the message to entities that are the targets or subjects of the message (1) irrespective of which social media sites the target entities have registered accounts with and (2) without manually identifying and specifying accounts of the target entities. Additionally, the communication tool allows a message originator to post to two or more of the message originator's own social media accounts at one time without the message originator having to access and post to each account individually.

As a result, the communication tool simplifies and improves communication over social media, provides an effective and efficient means for communicating one's experiences with other entities that the message originator does not have a preexisting relationship with, and provides a tool to inform interested third parties and the entities that are referenced in the messages as to how those entities are perceived by their peers, clientele, and others.

In some embodiments, the communication tool is tied back to an information aggregator. In some such embodiments, the communication tool blasts some or all messages to the information aggregator in addition to or instead of any automatically identified entity accounts. The information aggregator aggregates the received messages from different communication tools in order to develop a database for messages of different message originators that target different entities. The information aggregator can then present the messages that target a particular entity in a website, whereby the website can be used by entities that are interested in learning about the experiences that others have had with the particular entity irrespective of whether the particular entity has created or registered an account with any social media site and irrespective of which social media site the aggregated messages may have additionally been sent to. Accordingly, the particular entity and other entities can access a single page instead of pages on multiple social media sites to understand the particular entity's status in the marketplace or amongst its peers.

In some embodiments, the information aggregator utilizes the communication tool to identify and measure the credibility of a particular entity based on what others are saying about that particular entity. In some embodiments, the information aggregator targets specific advertising, promotions, or informational materials to a message originator based on the entities that are identified from the messages composed by the message originator.

BRIEF DESCRIPTION OF THE DRAWINGS

In order to achieve a better understanding of the nature of the present invention a preferred embodiment of the communication tool will now be described, by way of example only, with reference to the accompanying drawings in which:

FIG. 10 illustrates a computer system with which some embodiments are implemented.

DETAILED DESCRIPTION OF THE INVENTION

Figure 1:
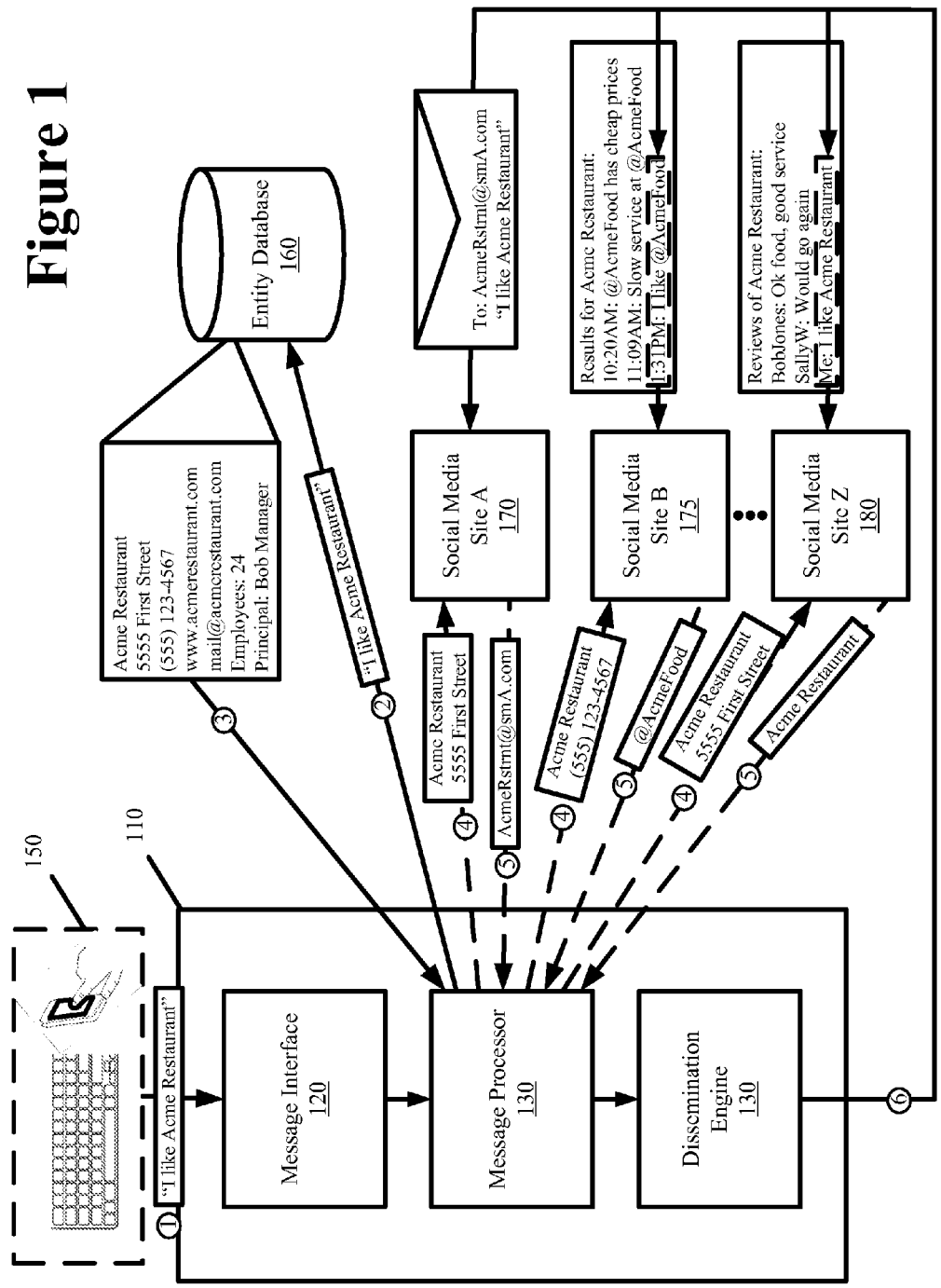
FIG. 1 illustrates components of the communication tool and a framework in which the communication tool operates in accordance with some embodiments.

In the following detailed description, numerous details, examples, and embodiments of a communication tool for social media are set forth and described. As one skilled in the art would understand in light of the present description, the communication tool is not limited to the embodiments set forth, and the systems and methods may be practiced without some of the specific details and examples discussed. Also, reference is made to the accompanying figures, which illustrate specific embodiments in which the communication tool can be practiced. It is to be understood that other embodiments can be used and structural changes can be made without departing from the scope of the embodiments herein described.

To facilitate the discussion, the term social media and social media site are used to refer to an online platform that facilitates intercommunication between entities that are registered with the online platform. Communication can occur in a variety of ways including posting, emailing, tweeting, messaging, instant messaging, etc. Twitter, Facebook, Google+, Yelp, LinkedIn, MySpace, Bebo, and Flickr are representative of some social media sites in accordance with some embodiments.

The term entity is used to describe an individual or a business. An entity can register different accounts with different social media sites. For the purposes of the communication tool described herein, each registered account is associated with at least one of a username, handle, or other identifier. An account registered with a particular social media site can be used to send messages to and receive messages from other entities that have registered an account at the particular social media site.

The term message is inclusive of the different forms of communication supported by the various social media sites and the communication tool. A message may include alphanumeric characters, audio, video, and graphics. Some messages that can be sent using the communication tool include Facebook posts, Facebook messages, Twitter tweets, and Yelp reviews. However, it should be apparent that the communication tool can be adapted to send other forms of messages that are supported by other social media sites.

An entity database includes a database that is operated and maintained by an information aggregator that aggregates data pertaining to different entities. Entity databases are established for different uses including lending of credit, risk management, marketing, supply chain management, tracking active or existing entities, tracking entity histories (e.g., financial, legal, etc.), etc. The aggregated data for a particular entity may include identification information (e.g., business or individual names), street addresses, email addresses, and telephone numbers that are associated with the particular entity. The aggregated data may further include financial records, credit history, legal history, etc. of the particular entity and also accounts that the particular entity has registered with one or more social media sites. Entity databases are well established in the art. Some examples of entity databases include those databases that are maintained by Dun & Bradstreet Credibility, TransUnion, and MyLife.com.

The terms blasting, posting, messaging, and sending are interchangeable and refer to the dissemination of a message from a source to a destination. As used herein, the source is the message originator and the destination can include one or more recipient.

I. Overview

To simplify and improve communication over distinct social media sites, some embodiments provide a communication tool to directly target and blast messages to entities that are automatically identified from the contents of the messages and that have may or may not have a presence on any one of several social media sites. Additionally or alternatively, the communication tool can be used to automatically blast a message to different accounts that a message originator has registered at different social media sites without the message originator having to access and post the message to each account individually. Additionally or alternatively, the communication tool can be used to by an information aggregator to aggregate messages in order to develop a database from which the messages that reference a particular entity can be presented to the particular entity or others interested in learning about the particular entity irrespective of whether the particular entity has created or registered an account with any social media site and irrespective of which social media site the messages may have originally been destined for.

In this manner, the communication tool simplifies and improves the way in which a message originator shares its experiences with a broader range of entities, especially with those that the message originator does not have a preexisting relationship with. Specifically, the communication tool makes communication on social media more efficient (1) by alleviating the need for a message originator to have to manually identify which social media sites an entity has an account registered at before being able to post a message to those accounts and (2) by alleviating the need to log in to one's own accounts at different social media sites in order to post the same message to all such accounts. Also, the communication tool serves as an invaluable marketing resource for entities that are referenced in the blasted messages as the communication tool automatically identifies and sends reviews, comments, and experiences that are about a particular entity to accounts of that particular entity such that the particular entity is made aware as to what others are saying about it. As a result, the particular entity can better understand its status in the marketplace and its status with respect to its peers and its customers. This understanding can be realized in real-time as the messages are disseminated. Furthermore, the particular entity will receive a greater quantity of messages (i.e., user experiences) than when using social media independent of the communication tool as the principal factor that prevented many message originators from using sites like Yelp, CitySearch, etc. as a conduit for reviewing or commenting about another is removed. Most notably, the communication tool removes the message originator from the burden of manually identifying an account of a particular entity that is referenced in the message before being able to send the message to that particular entity. Moreover, the particular entity can quickly respond to and resolve issues that customers may have had without the customers having to formally contact a customer support line of the particular entity.

The communication tool may be provided free of charge by an information aggregator based on the benefits that the information aggregator can derive by leveraging the communication tool as an information aggregation tool. In some embodiments, the information aggregator configures the communication tool to provide the automatically identified accounts of the entities that are referenced in a message back to the information aggregator. The information aggregator can then use this information to update or supplement entity identification information in an entity database and thereby obtain more information about various entities. In some embodiments, the information aggregator configures the communication tool to send messages to the information aggregator in addition to any entity accounts that are automatically or manually identified. Based on the messages that are aggregated for a particular entity, the information aggregator can generate a single page that centrally identifies what others have said about that particular entity across various social media sites even if the particular entity does not have an account registered at any of those social media sites. As a result, one no longer has to search across multiple social media sites to learn about a particular entity when each social media site would otherwise only provides a partial glimpse as to the status of the particular entity of interest.

Furthermore, the communication tool can be used to identify advertising, promotions, or other materials that would be of interest to the message originator based on the entities that are referenced and identified in the body of a message composed by the message originator. The information aggregator can also utilize the information obtained from the blasted messages (i.e., the identified entities) to develop a behavior profile for the message originator to identify likes and dislikes of the message originator and the behavior profile can be used to target advertising to the message originator through the communication tool or can be sold to the social media sites at which the message originator has registered an account in order for the social media site to better target advertising to the message originator. For instance, a message that references a pizza restaurant is highly indicative of the message originator having some interest in pizza. Consequently, the communication tool can be used to display coupons for various pizza restaurants.

II. Automated Linking and Message Blasting

The communication tool is embodied as a software application that executes on any network enabled device such as a smartphone, computer (e.g., desktop, laptop, terminal, etc.), tablet, etc. The communication tool is preferably implemented using a cross-platform language such as JAVA, HTML5, etc. Consequently, the communication tool is an application that can be executed on each of the iOS, OSX, Android, Windows, Unix, and Linux platforms among other platforms. Additionally, the communication tool can be an application that is directly run from within a web browser application without requiring installation on the host device. In summary, the communication tool can be executed by any device that is capable of posting or sending messages to any of one or more social media sites independent of the communication tool.

FIG. 1 illustrates components of the communication tool 110 and a framework in which the communication tool 110 operates in accordance with some embodiments. The communication tool 110 includes a message interface 120, a message processor 130, and a dissemination engine 140. The communication tool 110 communicably couples to one or more input interfaces 150 of the user device on which the communication tool 110 is running, an entity database 160, and one or more social networking sites (e.g., reference markers 170, 175, and 180) as further described below.

In some embodiments, the message interface 120 is the graphical region of the application in which the message originator composes a message. The message may be composed with user input that includes alphanumeric characters, audio, video, and graphical content. User input to the message interface 120 may be entered using one or more of the input interfaces 150. The input interfaces 150 include a keyboard (e.g., physical or virtual), touchscreen, voice digitizer, or other input peripheral.

Figure 2:
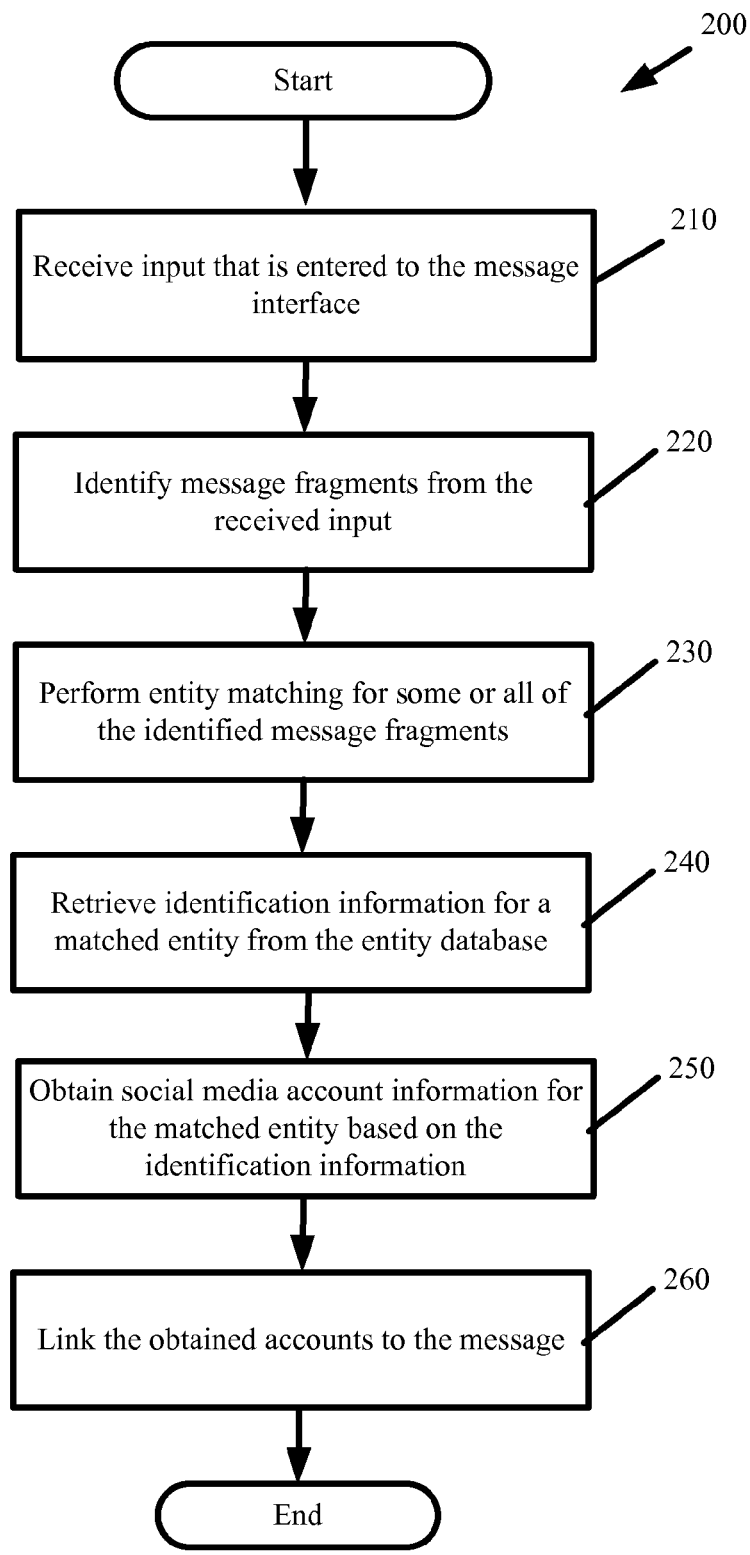
FIG. 2 presents a process performed by the message processor to automatically and in real-time identify entities that are referenced in the message in accordance with some embodiments.

The message processor 130 continually monitors for input that is entered in the message interface 120 in order to automatically and in real-time identify entities that are the target or subject of the message or that are otherwise referenced in the message. FIG. 2 presents a process 200 performed by the message processor 130 to automatically and in real-time identify entities that are referenced in the message in accordance with some embodiments.

The process 200 begins when input that includes a set of alphanumeric characters is entered for the body of a message being composed in the message interface 120. The process receives (at 210) the input as it is entered to the message interface 120. To receive the input, the message interface 120 mirrors the entered alphanumeric characters to the message processor 130.

The process identifies (at 220) message fragments from the received input. The identification at step 220 may be performed in real-time as the input is entered or with a slight delay. The message fragments are different permutations of subparts extracted from the received input. As some examples, the text "like Acme Restaurant" has the fragments "like", "Acme", "Restaurant", "like Acme", "Acme Restaurant".

The process performs (at 230) entity matching for some or all of the identified message fragments. Entity matching determines if the alphanumeric characters within any of the message fragments identifies a known or preexisting entity. This determination is made by comparing the alphanumeric characters within each of the message fragments to the names and other identification information of entities that are specified in the entity database 160. The other identification information can include an email address, telephone number, mailing address, etc. Based on the comparison, the process determines if the characters of a particular message fragment match by a specified threshold to a name or other identification information for an entity specified in the entity database 160. Various matching algorithms can be used to perform the entity matching, wherein the matching algorithms determine a match based on similar patterns, spelling, phonetics, etc. Matching algorithms to perform the entity matching are well known in the art, are commercially available, and the discussion of which is beyond the purposes of this discussion. In some embodiments, the matching algorithms are incorporated with the entity database 160. As an example of the entity matching performed at step 230, it is assumed that the alphanumeric characters of a particular message fragment are "Akme restaurant" and it is assumed that the entity database 160 includes records for the following entities: "Acme restaurant", "Akme Legal", ""Accme Inc.", and "Ackme Restaurant". The matching algorithm identifies that "Akme restaurant" matches to "Acme restaurant" by 85%, matches to "Akme Legal" by 50%, matches "Accme Inc." by 30%, and matches to Ackme Restaurant" by 75%. When the threshold for a valid match is at least 80%, the process automatically identifies the entity Acme restaurant (that matches by 85%) from the message fragment. To increase the accuracy of the entity matching, some embodiments utilize geolocation services on the device that the communication tool 110 is run. The geolocation services can identify a location (longitude and latitude coordinates) of the device as the message is entered. This location information can then be submitted along with the message fragment to more accurately identify matches in the entity database 160. For example, if the message fragment contains the characters "Acme Restaurant" and the entity database 160 contains two entities with that name, the location of the user device can be used to select the "Acme Restaurant" entity that is geographically closest to the location of the user device.

In some embodiments, the entity database 160 is included as part of the communication tool 110. In some embodiments, the entity database 160 is maintained by a remote third party that the communication tool 110 communicably couples to in order to perform the entity matching. In some such embodiments, the message processor 130 passes the message fragments to the entity database 160 for the entity database 160 to perform the query to determine if the fragment matches to an entity in the entity database 160 by the specified threshold.

To reduce the number of queries to the entity database 160 and to reduce the amount of processing that is performed by the message processor 130, some embodiments filter the message fragments and issue the filtered message fragments to the entity database 160 instead of all the possible message fragments. In some embodiments, filtering includes identifying fragments with alphanumeric characters that satisfy predefined patterns. By identifying the predefined patterns, the process can isolate fragments that potentially contain names of individuals (e.g., capital letter followed by lower case letters) or businesses (e.g., sequence of letters followed by "inc", "co", "corp", "llp", etc.), telephone numbers (e.g., a seven or ten digit number), mailing addresses, email addresses (e.g., text that is followed by "@" and ends with ".com" or ".net"), and Uniform Resource Locators (URLs) while filtering out other message fragments that do not include characters with such predefined patterns. In some embodiments, filtering includes applying a set of grammar rules to the message fragments to determine if the message fragment can include a target entity. For example, the set of grammar rules can be applied to ignore message fragments that contain the predicate of a sentence while processing message fragments that contain the subject of a sentence. In some embodiments, filtering includes automatically expanding abbreviations or correcting misspellings in the message fragments. The filters are defined as a set of algorithms stored as part of the communication tool 110 and executed by the message processor 130.

When the message fragment does not match to an entity in the entity database, the message fragment is ignored and the process 200 is performed using a different message fragment. When a message fragment matches to an entity in the entity database by the specified threshold, the process retrieves (at 240) identification information for the entity from the entity database 160 and the process uses the identification information to obtain (at 250) the social media accounts registered by the entity. In some embodiments, the identification information includes a proper or verified name of the particular entity (e.g., individual or business name) and zero or more of a mailing address, telephone number, website URL, and email address for the entity. In some embodiments, the social media accounts are identified by usernames, handles, or other identifiers. In some embodiments, the social media accounts (i.e., usernames, handles, or other identifiers) are stored in the entity database 160 as part of the identification information such that the process 200 can directly obtain the social media accounts from the entity database 160. U.S. provisional patent application 61/505,738 entitled "Automated Entity Verification" describes a method for which social media accounts may be automatically verified and stored as part of identification information in an entity database.

When social media accounts are not present in the entity database 160, the process queries each of a set of social media sites to determine if an account is registered at the social media site with information that matches by some threshold degree to the name and other available identification information that is obtained for the matching entity from the entity database 160. A query interface is typically available at most social media sites. The communication tool is preconfigured with the URLs for accessing the query interfaces of different social media sites. The communication tool is further configured to interact with the query interfaces by submitting identification information obtained from the entity database as a query input parameter and to scrape the results that are produced by the query. The social media site compares the query input parameters (i.e., entity identification information) with identification information that different registrants provided to the social media site at the time of registering an account with the social media site. For example, to register a Facebook account or a Twitter account, the registrant is typically asked to enter a name and email address. The provided name and email address then become associated with the registered Facebook account or Twitter account. If the same or similar name is provided through the query interface, the social media site will identify the account that is registered with the same or similar name. The communication tool can then scrape the account handle, username, or other identifier from the query results. Accordingly, when an account is identified using the identification information that is obtained for the matching entity from the entity database 160, the account information (e.g., username, handle, or hyperlink) is obtained (at 250) by the message processor 130 from the social media site.

Figure 3:
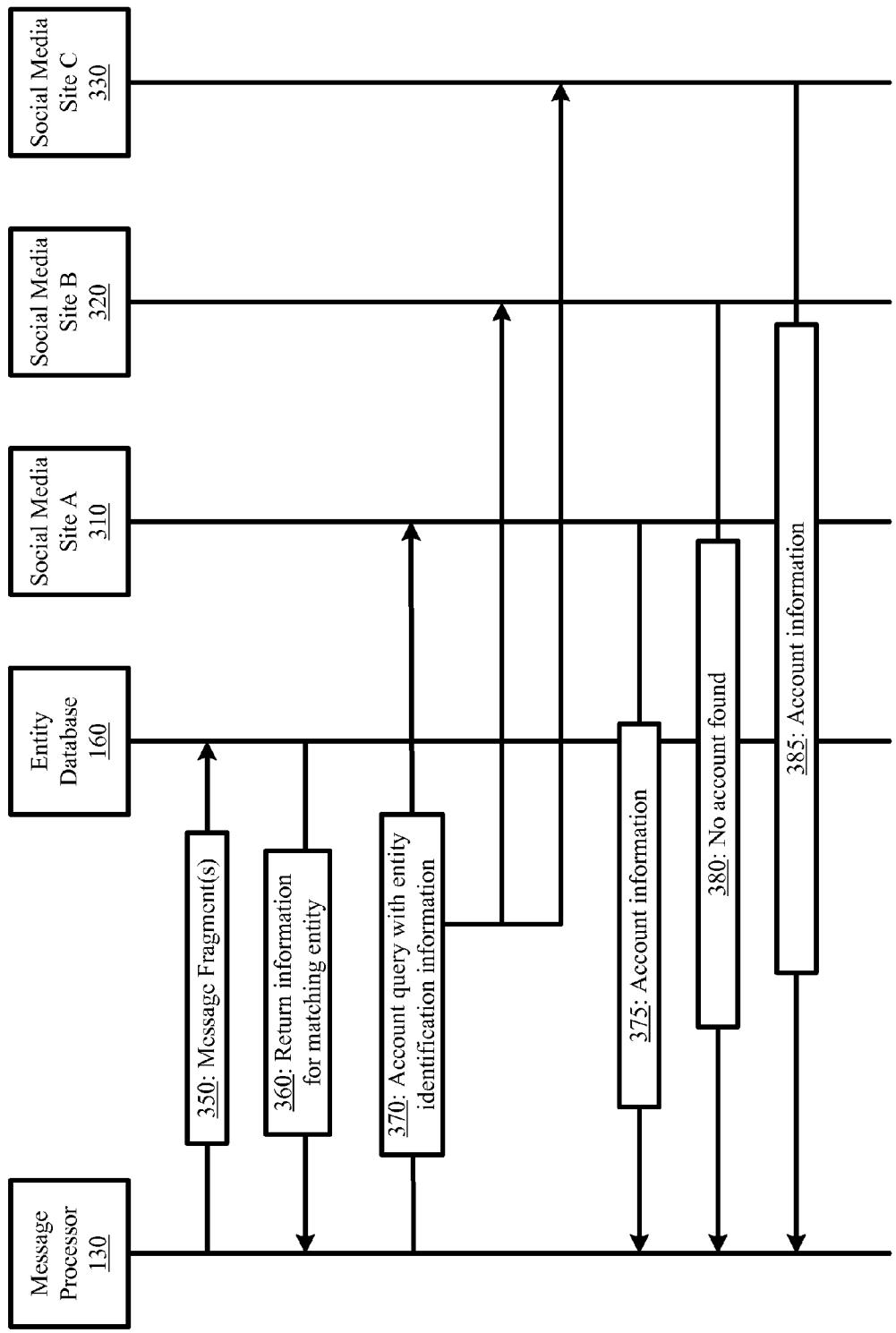
FIG. 3 presents a message exchange diagram performed by the message processor to obtain social media accounts for a matching entity when the social media accounts are not present in the entity database.

FIG. 3 presents a message exchange diagram performed by the message processor 130 to obtain social media accounts for a matching entity when the social media accounts are not present in the entity database 160. More specifically, the message exchange of FIG. 3 is performed when a message fragment from a message that is entered into the message interface 120 matches to an entity in the entity database 160 by the specified threshold degree, but the social media account information for that entity is not present in the entity database 160 and is otherwise obtained by the message processor 130 querying various social media sites with the identification information that is obtained for the matched entity from the entity database 160. This figure illustrates the message processor 130, the entity database 160, and three distinct social media sites 310, 320, and 330.

The message exchange commences with the message processor 130 passing (at 350) a message fragment to the entity database 160. Using the alphanumeric characters in the message fragment to perform the entity matching, the entity database 160 identifies a particular entity that matches to the alphanumeric characters by the specified threshold. The entity database 160 returns (at 360) the proper and/or verified name and other available identification information for the particular entity to the message processor 130.

Next, the message processor 130 queries (at 370) each of the social media sites 310, 320, and 330 with the particular entity's name and other available identification information obtained from the entity database 160 to determine if there is a registered account that is associated in some manner with the identification information at each of the social media sites 310, 320, and 330. Any identified accounts that match to the provided identification information by a specified threshold are then returned to the message processor 130. Returning the account information may be performed by the message processor 130 using a data scraper to extract the account information that is presented at each of the social media sites 310, 320, and 330 as a result of the identification information queries performed at 370. The extracted account information can then be run against a local matching process to ensure that the extracted account information matches to the matched entity's identification information by the specified threshold. In some embodiments, message processor 130 issues variations of the same query to the social media sites 310, 320, and 330 and any account that is consistently present in each of the query results is then returned as matching by the specified threshold. For example, the message processor performs a first query with the name of the matching entity that is obtained from the entity database 160, a second query with the mailing address of the matching entity that is obtained from the entity database 160, and a third query with the email address of the matching entity that is obtained from the entity database 160. When the same registered account appears in the results of all three queries, that account is returned to the message processor 130 (using data scraping and extraction by the message processor 130). As shown, accounts (at 375 and 385) that match to the identification information provided by the message processor 130 are returned from the social media sites 310 and 330. However, no account is returned from the social media site 320, indicating that no account is registered with information that matches to the identification information provided by the message processor 130 at 370.

With reference back to FIG. 2, the process links (at 250) the returned accounts with the message in the message interface 120 and the process ends or the process is restarted with a different message fragment until all message fragments entered into the message interface 120 have been processed. Linking the accounts includes automatically associating the accounts with the message that was entered into the message interface 120. In some embodiments, linking the accounts includes replacing the alphanumeric characters in the message interface 130 that were used to identify the one or more entities with the usernames, handles, or hyperlinks of the identified accounts. In some embodiments, linking the accounts includes automatically populating the recipient or destination list for the message with the automatically identified accounts. These accounts may be added to other accounts that the user has manually specified, though it should be apparent that the communication tool adds the automatically identified accounts without the message originator manually or explicitly specifying the accounts. In some embodiments, linking the accounts includes embedding the accounts in metadata and providing some indication in the message interface 120 that a segment of text has been linked to one or more automatically identified accounts. For example, the word or phrase that was used to identify an entity is underlined and the underlined word or phrase can be selected to reveal the accounts that have been linked to it. In some embodiments, the identification information that is obtained from the entity database for an identified entity is also linked or associated with the message in the message interface 120.

Figure 4:
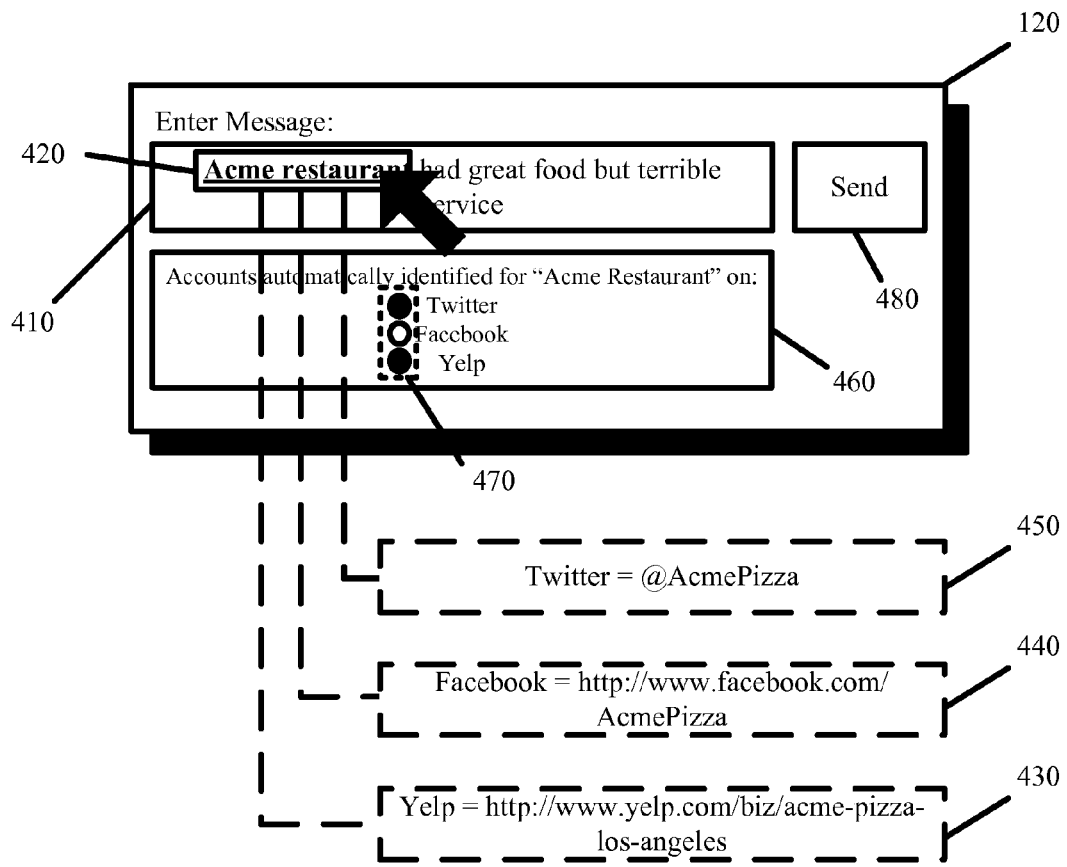
FIG. 4 conceptually illustrates linking automatically identified Twitter, Facebook, and Yelp accounts with a message that is entered into the message interface of the communication tool in accordance with some embodiments.

FIG. 4 conceptually illustrates linking automatically identified Twitter, Facebook, and Yelp accounts with a message that is entered into the message interface 120 of the communication tool 110 in accordance with some embodiments. FIG. 4 illustrates the message interface 120 with the user entered message 410 "Acme restaurant had great food but terrible service". From the message fragment "Acme restaurant" 420, the message processor 130 (not shown) is able to automatically identify and link the Yelp account 430 of "http://www.yelp.com/biz/acme-pizza-los-angeles", the Facebook account 440 of "http://www.facebook.com/Acme- Pizza", and the Twitter account 450 of "@AcmePizza" to the message 410. The linking of the accounts to the message fragment 420 is indicated by bolding and underlining the message fragment 420. It should be apparent that other means of indication are possible. With a mouse-over or a selection of the message fragment 420, the message originator can cause the accounts 430-450 that are linked to the message fragment 420 to be displayed in the message interface 120. In some embodiments, the status window 460 is automatically populated with the social media sites for which an account has been automatically identified. Specifically, as the message originator composes the message 420 in the message interface 120, the status window 460 can be populated based on accounts that are identified in real-time. Selection bubbles 470 next to each of the social media sites can then be selected or deselected by the message originator in order to specify which social media accounts for the identified entity the message should be blasted to. Once accounts have been automatically linked to a message and the message originator finishes composing the message, the message originator can invoke the send function 480 to blast the message to the automatically linked accounts 430, 440, and 450. It should be apparent that the message interface 120 allows the message originator the ability to also manually specify other entities that it wishes the message to be sent to.

With reference back to FIG. 1, the dissemination engine 140 is tasked with sending a composed message to accounts at different social media sites when the message originator invokes the send function of the communication tool to send the message. The dissemination engine 140 sends the message to accounts of the entities that were automatically identified by the message processor 130 based on the above described processes and methods performed by the message processor 130. Additionally or alternatively, the dissemination engine 140 sends the message to different accounts that the message originator has registered at different social media sites, thereby allowing the message originator to blast the message to any social media site that it has an online presence at without having to login and post the message to each such site individually. As will be described below with reference to FIG. 5, the communication tool 110 includes configuration settings to specify which accounts to send the message to.

To initiate the sending of the message, the dissemination engine 140 encapsulates the message differently depending on which social media sites the message is to be sent to. Encapsulating the message includes formatting the message to a data structure format that conforms with the messaging format of the social media site that the message is to be sent to. For example, a different communication protocol and messaging format may be used when sending the same message to a Facebook account and a Twitter account. Encapsulating the message further includes generating the proper header and body for the datagram or data packet that is to carry the message over a data network that connects the device on which the communication tool 110 runs with the destination social media site. The datagram is typically an Internet Protocol (IP) based data packet, however different social media sites may utilize different protocols for communications over a data network. As part of the datagram generation, the dissemination engine 140 specifies the source and destination of the message. As noted above, the destination may include zero or more accounts that the message originator has registered at various social media sites and may include zero or more accounts of entities that were identified from the contents of the message. The source may include an account of the message originator at the social media site that the message is intended for or may alternatively include an account that is for use by the communication tool at the social media site such that the message can be sent to any destination social media site without the message originator needing to have an account registered at that social media site.

When sending the message using accounts that the message originator has registered at one or more social media sites, the message originator provides the login information for those accounts when configuring the communication tool 110. By using the accounts the message originator has registered, the communication tool 110 can be used to send messages on any social media site without requiring any changes on the social media site to support the communication tool 110.

To allow the message originator to send a message to a targeted account at a particular social media site without requiring the message originator to have an account registered at the particular social media site, the communication tool 110 may optionally send the message from an account that is registered at the particular social media site exclusively for use by the communication tool 110. In some embodiments, an exclusive account is registered at each social media site that is supported by the communication tool 110 and the login information for that account is configured in the configuration tool 110 such that when a message is to be sent to a particular social media site, the communication tool 110 is able to access the exclusive account at the particular social media and send the message from that exclusive account. The message is sent from the account on behalf of the message originator. In some such embodiments, the communication tool appends a signature or other identifier to the end of the message such that the recipient can identify who the message came from even when the message is sent using the communication tool shared account. For some such embodiments, it should be evident that messages that are composed by different users using different implementations of the same communication tool 110 can be sent from the same communication tool shared account at a particular service provider.

To send a message to an account at a particular social media site, the dissemination engine 140 performs a handshaking procedure with the particular social media site to login to an account of the message originator or a communication tool shared account at that particular social media site. Once logged in, the dissemination engine 140 sends the properly encapsulated message to the particular social media site in a datagram over a network interface of the device on which the communication tool 110 is running. The particular social media site receives and posts the message to the account of the entity recipient identified as the destination in the encapsulated message. As noted above, the recipients can be specified to include accounts that the message originator has registered at different social media sites and wishes to post the message to and/or accounts for any entity that is automatically identified from the body of the message. Accordingly, the message originator can use the communication tool to blast a message to all of the message originator's social media accounts without having to individually login, compose the message, and disseminate the message at each such site. Moreover, the message originator can rapidly compose and disseminate a message to various social media accounts of a particular entity that is referenced in the message without (1) the message originator having prior knowledge as to which social media sites the particular entity has an account registered at, (2) the message originator identifying what the handle, username, or other identifier for the account of the particular entity is, (3) the message originator having to independently login to the social media site where an account of the particular entity exists in order to send a message to that account, and (4) the message originator repeatedly entering the message to submit to each account that the particular entity has registered at one or more social media sites. The communication tool 110 allows the message originator to simply focus on composing and sending the message. For example, the message originator can compose a single message that the communication tool then automatically disseminates to an account that the message originator has registered at Facebook, an account that the message originator has registered at Twitter, and an account of an automatically identified entity that is registered at Google+ even if the message originator does not have an account registered at Google+. In so doing, the communication tool 110 greatly simplifies the use of social media as a communication platform. Specifically, message originators can post reviews about, comment on, or share experiences with entities that are the target of, subject of, or referenced in a message without the message originator having a preexisting online relationship with those entities. This communication tool 110 also allows a message originator to reach a larger audience by directly and automatically sending messages to accounts of the message originator and referenced entities across different social media sites.

In some embodiments, the communication tool 110 is setup by a user (i.e., message originator) prior to providing some of the above described automatic entity identification, linking, and message blasting functionality. Some of the setup parameters include (1) selecting whether to blast messages to accounts of the message originator, accounts of entities that are identified from the contents of the messages, or both, (2) selecting which social media sites the communication tool 110 is to automatically identify accounts from and blast message to, (3) providing login information for accounts of the message originator at the selected social media sites, and (4) selecting the level of automatic entity identification (e.g., off, identify only the targets or subjects of a message, or identify any entity that is referenced in the message). The setup parameters can be set the first instance the communication tool 110 is run. The setup parameters can also be modified at a later time as desired by a user.

Figure 5:
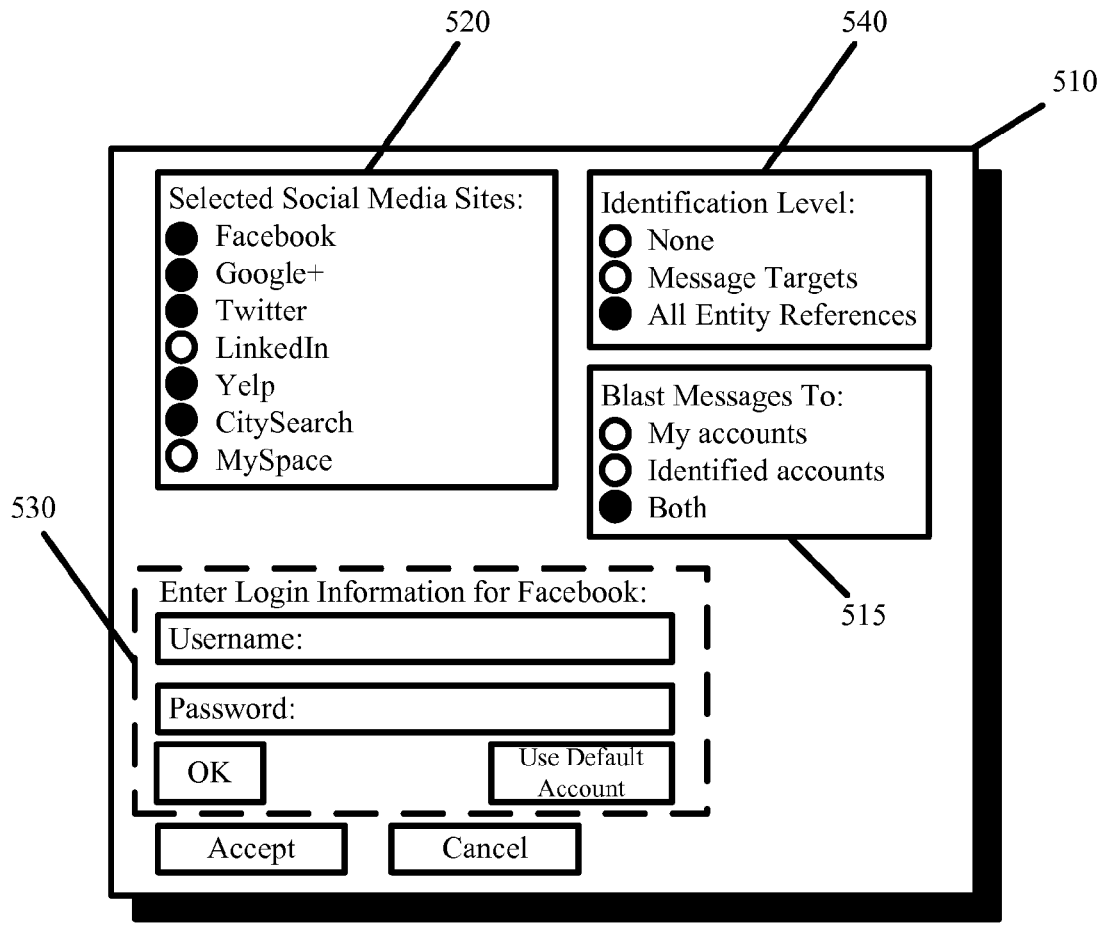
FIG. 5 conceptually illustrates a setup screen of the communication tool that a user uses to specify the setup parameters in accordance with some embodiments.

FIG. 5 conceptually illustrates a setup screen 510 of the communication tool 110 that a user uses to specify the setup parameters in accordance with some embodiments. The setup screen 510 includes various interactive interfaces 515, 520, 530, and 540.

The interactive interface 515 allows the user to select whether the messages are to be blasted to accounts of the message originator, to accounts of entities that are referenced in the messages, or to both. The setup screen 510 provides the interactive interface 530 to collect the login information for the various accounts of the message originator at different social media sites.

The interactive interface 520 allows the user to select which social media sites the dissemination engine 140 will blast a message to. When the interactive interface 515 is set to blast messages to accounts of entities that are referenced in the messages, the setting for the interactive interface 520 is used to select which social media sites the message processor 130 automatically identifies entity accounts from. For example, when the interactive interface 515 has the Facebook and Twitter options selected, the message processor 130 will attempt to identify accounts for entities that are referenced, the target of, or the subject of a message from only Facebook and Twitter. Entity account identification will not be performed for other social media sites.

Figure 6:
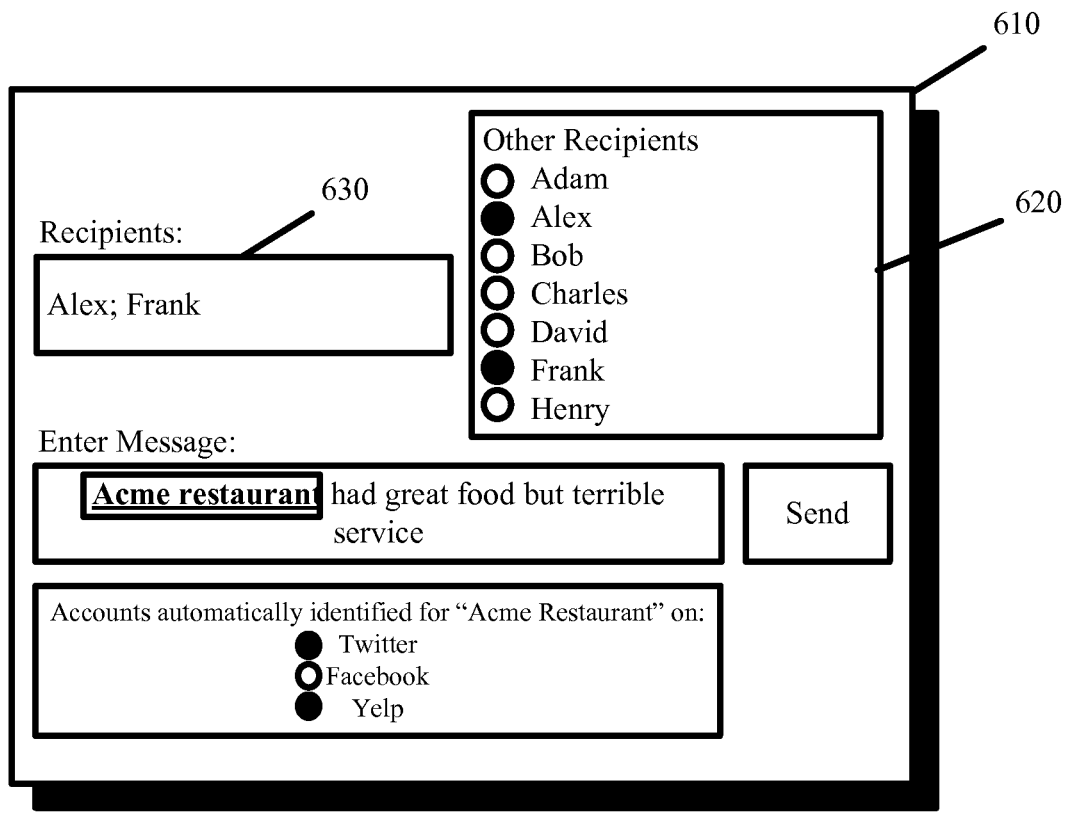
FIG. 6 illustrates an enhanced message interface that includes a list of entity accounts that the communication tool scrapes from accounts that the user provides login information for in the interactive interface.

The interactive interface 530 operates in conjunction with the interactive interface 520. In some embodiments, the interactive interface 530 requests the user to provide login information (i.e., username and password) for accounts that the user has registered at each of the selected social media sites. As noted above, these accounts are used by the communication tool 110 to originate the messages at each of the selected social media sites. For example, a message that is blasted from the communication tool 110 to Facebook, Twitter, and Yelp will use the Facebook account of the message originator to blast the message to Facebook, the Twitter account of the message originator to blast the message to Twitter, and the Yelp account of the message originator to blast the message to Yelp. Using the existing accounts, the communication tool can be adapted to disseminate messages on any social media site without modification to the social media site or without the need for using any specialized interfaces, communication protocols, or the like. In the event the user does not have an account registered at a particular social media site, the user may select to use a default account. When the default account is selected for a particular social media site, messages from the user are blasted on behalf of the user from an account that the communication tool has registered at the particular social media site. In some embodiments, when the user does not have an account registered at a particular social media site, the interactive interface 530 temporarily redirects the user to a registration page for the particular social media site or may provide its own registration interface to gather registration information from the user in order to automatically register the user at the particular social media site. The communication tool 110 logs in to each of the provided accounts. The login may be performed each time the communication tool 110 is started up or when the user invokes the send function to blast a message to the selected social media sites. In some embodiments, the communication tool 110 automatically logs in to each of the provided accounts on different social media sites to scrape and aggregate the list of entity accounts that the user has established a relationship with. In some such embodiments, these entity accounts are stored in the communication tool 110 and an identifier for each of the entity accounts is presented to the user in the message interface 120 to allow the user to manually select other entities that the message should be blasted to in addition to the user's own accounts and/or accounts for automatically identified entities. For example, FIG. 6 illustrates an enhanced message interface 610 that includes a list of entity accounts that the communication tool 110 scrapes from accounts that the user provides login information for in the interactive interface 530. The user can select zero or more of the entities from the interactive interface 620 to manually specify additional entities that are to receive the message. Additionally, the enhanced interface includes a text entry box 630 that the user can manually enter accounts of other entities to receive the message.

The interactive interface 540 of FIG. 5 allows the user to specify the level with which the communication tool 110 automatically identifies entities based on messages entered into the message interface 120. In some embodiments, the interactive interface 540 has three settings. A first setting disables the automatic identification of entities. A second setting causes the message processor 130 to identify accounts for entities that are the target or subject of the message entered into the message interface 120. A third setting causes the message processor 130 to identify accounts for any entities that are references in the message entered into the message interface 120 irrespective of whether the entities are the target or subject of the message.

III. Information Aggregation and Derived Uses

While the communication tool 110 provides several advantages to a message originator, the communication tool 110 also provides several advantages to an information aggregator, such as Dun & Bradstreet Credibility. These advantages to the information aggregator allow the information aggregator to freely distribute the communication tool 110 while still benefiting from the communication tool 110. Some of these advantages and benefits are described below.

In some embodiments, the information aggregator that distributes the communication tool 110 configures the communication tool 110 to send to the information aggregator any accounts that the communication tool automatically identifies and/or links to a message. The information aggregator utilizes this information to update or maintain a third party entity database or its own entity database. By entering the account information to the entity database, the entity database obtains more information about various entities. This additional information creates a more complete record for the entities in the entity database which can then be used for purposes of background verification, credit reporting, etc. Additionally, storing the identified accounts to the entity database accelerates the automated entity account identification that is performed by the communication tool 110. For instance, once one communication tool identifies an account for a particular entity at a particular social media site and that communication tool enters the identified account into the entity database, the next instance an account for the particular entity at the particular social media site is to be identified, the identification can be performed based on preexisting information in the entity database. This then avoids the communication tool from again having to identify the account for the particular entity via the particular social media site.

In some embodiments, the information aggregator that distributes the communication tool 110 configures the communication tool 110 to send messages to the information aggregator in addition to or instead of any social media site accounts of the message originator or social media site accounts that are automatically or manually identified. This allows the information aggregator to become a central repository for all social media messages that target or reference different entities. From this repository, the information aggregator produces a single page or website that presents messages that reference a particular entity, wherein (1) these messages could otherwise be scattered across different social media sites when the particular entity has different social media site accounts to which others can post messages to or (2) messages that reference the particular entity would be difficult for others to find when there is no central site to view messages that reference the particular entity as a result of the particular entity not having registered or created accounts at the various social media sites. The combination of the communication tool and the information aggregator therefore makes it far simpler for one to post messages that reference a particular entity and for others to view those messages. Specifically, the message originator no longer has to specify a recipient for a message. The communication tool in conjunction with the information aggregator either will automatically identify the accounts of the entities that are referenced in the message and send the message to those accounts or will identify the entities that are referenced in the message and the information aggregator will aggregate the message with other aggregated messages that reference the same entity. Similarly, others wanting to view messages about a particular entity no longer have to search across different social media sites to identify whether an account for the particular entity exists to which others have posted messages to. Instead, one need only access the page or website produced by the information aggregator that presents the aggregated messages referencing the particular entity.

Figure 7:
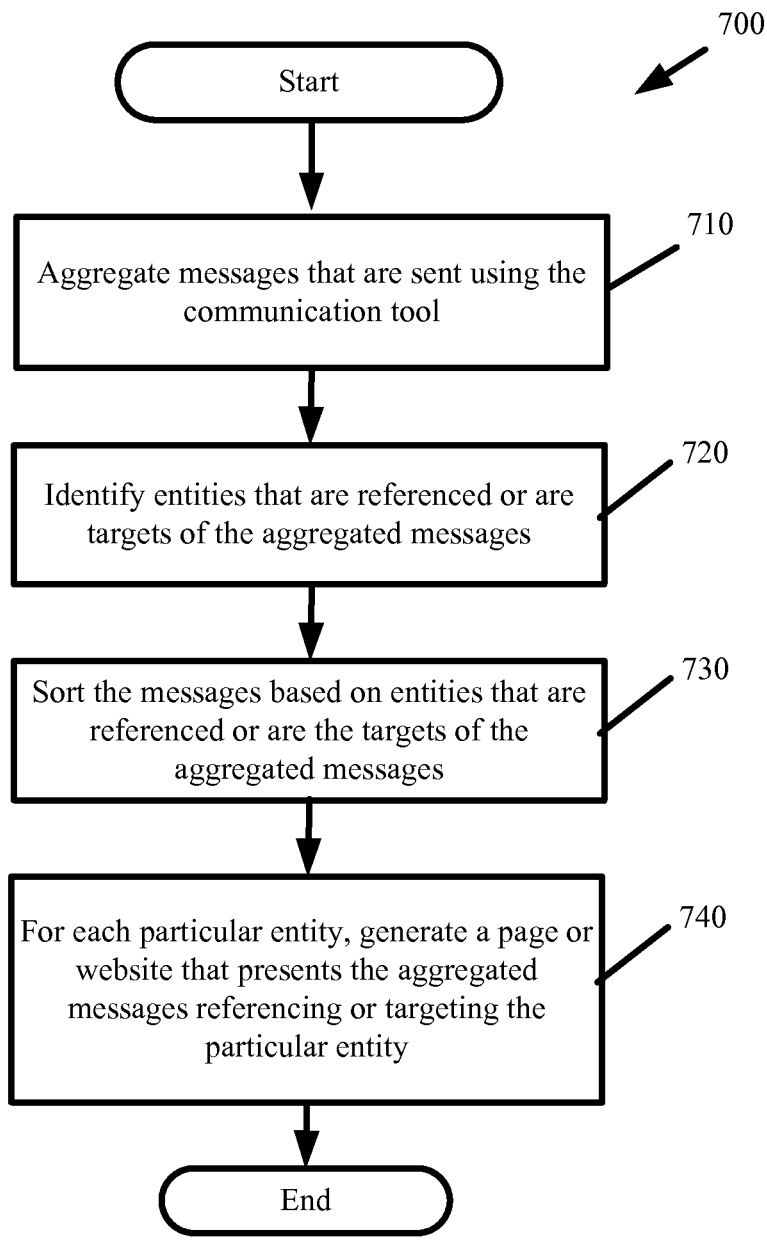
FIG. 7 presents a process for generating a central repository of social media messages using the communication tool in accordance with some embodiments.

FIG. 7 presents a process 700 for generating a central repository of social media messages using the communication tool 110 in accordance with some embodiments. The process 700 begins by the information aggregator aggregating (at 710) messages that are sent using the communication tool 110. As noted above, the communication tool 110 may be configured to disseminate messages to the information aggregator in addition to or instead of disseminating messages to the different social media site accounts that are automatically identified for entities that are referenced in the messages or to different social media site accounts of the message originators. Aggregation may be continually performed as different communication tools are used to compose and blast messages. The process identifies (at 720) entities that are referenced or are targets of the aggregated messages. To do so, the process may leverage the information that the message processor 130 links to the messages. As described above, the message processor 130 links to the message accounts that are automatically identified for the referenced entities. This account information can be used by the information aggregator to identify which entities are referenced in which messages. In some embodiments, the message processor 130 is adapted to not only link the automatically identified accounts to the message, but to also link to the message identification information for any referenced entity, where the identification information includes a name of the entity as obtained from the entity database as a result of the matching process that the message processor 130 performs with the entity database. In some embodiments, the entity identification is performed independently by the information aggregator by matching different message fragments from the aggregated messages to identification information for different entities that is stored in different records of the entity database.

Next, the information aggregator sorts (at 730) the messages based on the identified entities. More specifically, the information aggregator sorts the messages to define different groups of messages with each group of messages including messages that reference or target a particular entity. For each particular entity, the information aggregator then automatically generates (at 740) a page or website that presents the aggregated messages referencing or targeting the particular entity. That page or website is accessible to anyone wanting to ascertain the status of the particular entity by viewing what others have said about that particular entity. In so doing, messages that reference or target a particular entity can be seen at a single page or website of the information aggregator irrespective of whether that particular entity has an account that is registered at any social media site and irrespective of whether that particular entity has any online presence whatsoever. Moreover, the single page or website that is generated by the information aggregator aggregates all messages that reference or target the particular entity irrespective of whether the messages were originally destined for different social media accounts of the particular entity. In this manner, the pages or websites of the information aggregator serve as a central repository of information that provides a holistic view of the particular entity based on partial or incomplete views that are collected from various social media sites. More specifically, one need only visit a page that is generated by the information aggregator for a particular entity to view what others are saying about that particular entity across disparate social media sites such as Facebook, Google+, Yelp, etc. without the viewer having to individually visit each of the sites.

Figure 8:
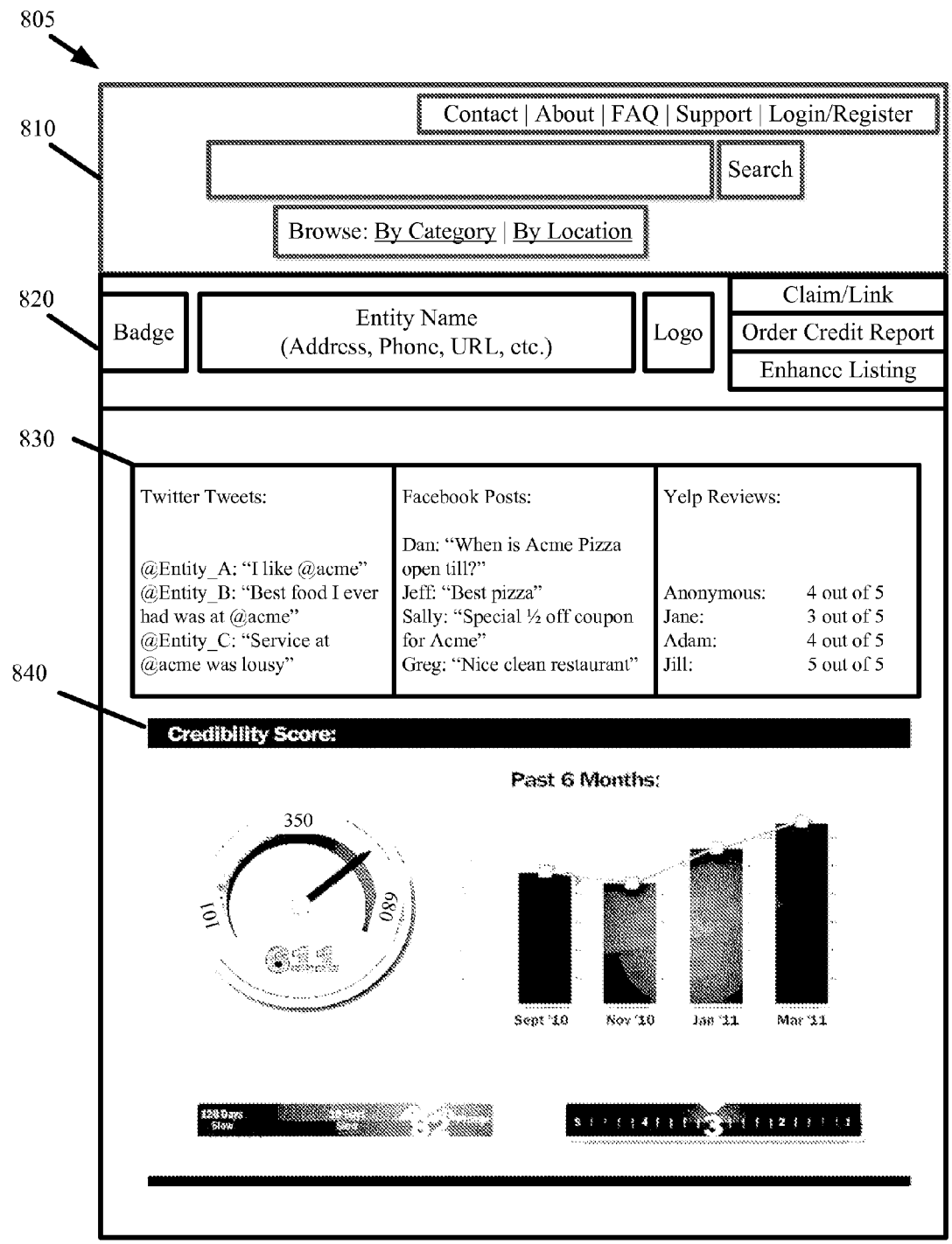
FIG. 8 conceptually illustrates a page that is generated by an information aggregator for a particular entity based on messages aggregated from the communication tool in accordance with some embodiments.

FIG. 8 conceptually illustrates a page 805 that is generated by an information aggregator for a particular entity based on messages aggregated from the communication tool in accordance with some embodiments. As shown, the page 805 includes various sections 810, 820, 830, and 840. A first section 810 provides a search interface to access a page for a particular entity of interest. A second section 820 identifies which entity the current page 805 is related to. In some embodiments, section 820 provides the name, mailing address, telephone number, URL, email address, etc. for the entity of the current page 805. The identification of the particular entity in section 820 may include identification information that is available in the entity database for the particular entity. A third section 830 displays the aggregated messages that target or otherwise reference the particular entity. This section 830 includes messages that were sent to different accounts that the particular entity has registered at different social media sites. A fourth section 840 displays credibility information for the particular entity. In some embodiments, the credibility information includes a credibility score for the particular entity that is derived from sentiment analysis of the aggregated messages. In some embodiments, the credibility score is updated in real-time as new messages are aggregated from the various communication tools that are in use. It should be apparent to one of ordinary skill in the art that the page 805 may include additional sections that display credit information, financial information, trade references, or other information about the particular entity.

In some embodiments, the messages that are aggregated from a particular communication tool can be processed to identify and send advertising, promotions, and other informational materials that pertain to entities referenced in the aggregated messages. The advertising, promotions, and other information materials are displayed in the interface of the communication tool. In some embodiments, the information aggregator aggregates the messages from the communication tool and the information aggregator couples to an advertising server to identify and send targeted advertising, promotions, and other informational materials to the communication tool that are relevant to entities referenced in the aggregated messages. Accordingly, if a message originator composes and disseminates a message that comments on a pizza restaurant, the communication tool can present coupons for the commented on pizza restaurant or other geographically proximate pizza restaurants.

Figure 9:
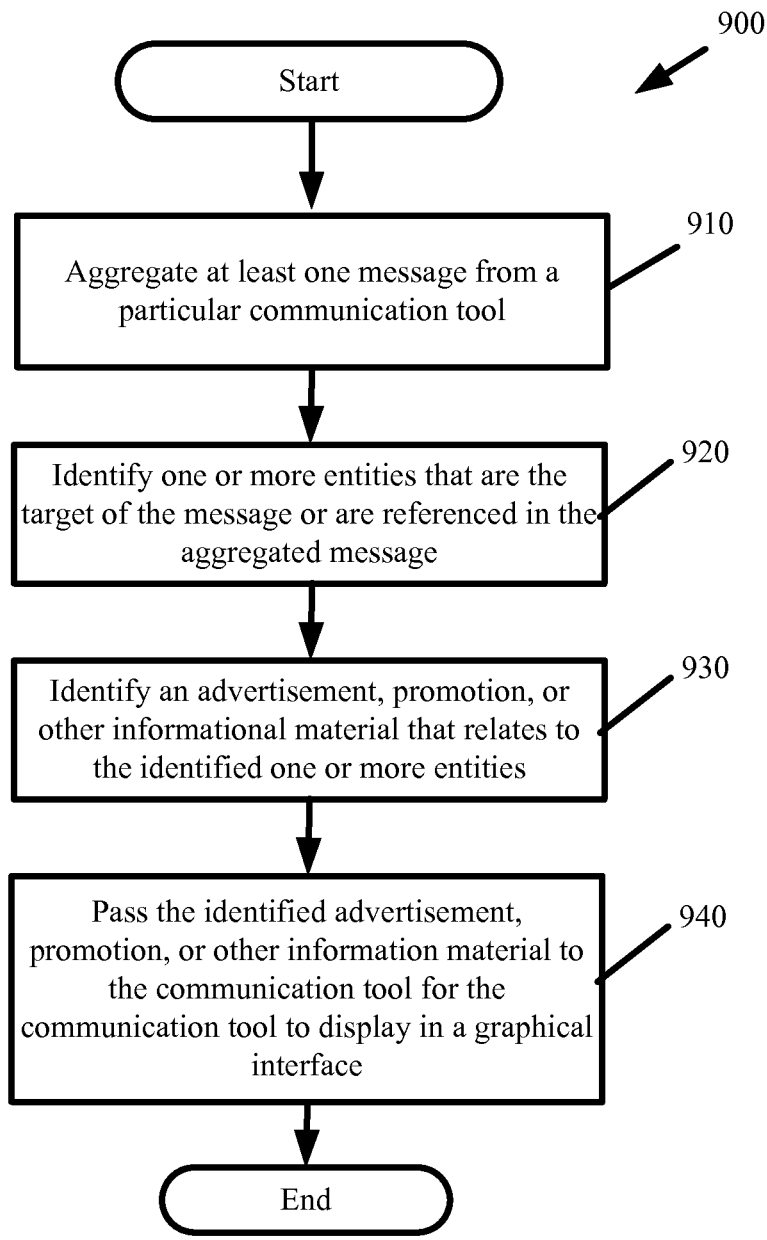
FIG. 9 presents a process for utilizing the communication tool as a platform with which to present targeted advertising in accordance with some embodiments.

FIG. 9 presents a process 900 for utilizing the communication tool as a platform with which to present targeted advertising in accordance with some embodiments. The process 900 begins by the information aggregator aggregating (at 910) at least one message from a particular communication tool. The message may be aggregated as it is being composed in the communication tool or once it is disseminated by the communication tool. The process identifies (at 920) one or more entities that are the target of the aggregated message or are referenced in the aggregated message. Such identification can be performed by the information aggregator according to the aforementioned entity matching wherein different message fragments are used to query the entity database in order to determine whether a particular message fragment matches with information identifying a particular entity by a specified threshold. When a match is found, the process identifies (at 930) an advertisement, promotion, or other informational material that relates to the identified entity. In some embodiments, the information aggregator passes the name for an identified entity to an advertising server. The advertising server then returns an advertisement, promotion, or other information material that is related to the identified entity. In some embodiments, the information aggregator partners with various entities. The partner entities provide the information aggregator with advertisements, promotions, or other information materials that they wish to have disseminated when the partner entities or other related entities (e.g., competitors, suppliers, business partners, etc.) are referenced in an aggregated message. For example, Acme Inc. partners with the information aggregator such that whenever Acme Inc. is referenced in a message aggregated from a particular communication tool, an advertisement provided by Acme Inc. is sent by the information aggregator to the particular communication tool. The process passes (at 940) the identified advertisement, promotion, or other information material to the communication tool for the communication tool to display in a graphical interface and the process ends. In some embodiments, the information aggregator has a secure link to the communication tool such that only the information aggregator can place advertisements on the communication tool. In some embodiments, the advertising server can directly place advertisements on the communication tool based on information provided by the communication tool to the advertising server.

In some embodiments, the information aggregator aggregates messages from each instance of a communication tool to develop a behavior profile for the message originator that is associated with each such communication tool. To do so, the information aggregator sorts the messages that are aggregated from each communication tool into separate groups. Each communication tool can be identified based on an IP address that is assigned to the end user device on which the communication tool runs. Alternatively, each instance of a communication tool can be assigned its own unique identifier that is embedded as part of the messages disseminated by that communication tool. In such instances, when the information aggregator aggregates the messages from the communication tools, the embedded identifier is used to sort the messages per communication tool. Over time, the information aggregator will have aggregated multiple messages from each particular communication tool. The information aggregator can then analyze the messages that are aggregated from a particular communication tool in order to develop the behavior profile. For example, messages from a first communication tool may repeatedly reference sports teams or sports figures such that the information aggregator sends sports related advertisements, information, etc. to the first communication tool and messages from a second communication tool may repeatedly reference restaurants such that the information aggregator sends dining related advertisements and promotions to the second communication tool. In some embodiments, the information aggregator can sell the behavior profile to advertisers or other content providers.

IV. Hardware System

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer and computer system is meant in its broadest sense, and can include any electronic device with a processor including cellular telephones, smartphones, portable digital assistants, tablet devices, laptops, and netbooks. Examples of computer readable media include, but are not limited to, CD-ROMs, flash drives, RAM chips, hard drives, EPROMs, etc.

FIG. 10 illustrates a computer system with which some embodiments are implemented. Such a computer system includes various types of computer readable mediums and interfaces for various other types of computer readable mediums that implement the various processes, modules, and engines described above for the communication tool. Computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025. From these various memory units, the processor 1010 retrieves instructions to execute and data to process in order to execute the processes of the invention. The processor 1010 is a processing device such as a central processing unit, integrated circuit, graphical processing unit, etc.

The read-only-memory (ROM) 1020 stores static data and instructions that are needed by the processor 1010 and other modules of the computer system. The permanent storage device 1025, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1025.

Other embodiments use a removable storage device (such as a flash drive) as the permanent storage device Like the permanent storage device 1025, the system memory 1015 is a read-and-write memory device. However, unlike storage device 1025, the system memory is a volatile read-and-write memory, such a random access memory (RAM). The system memory stores some of the instructions and data that the processor needs at runtime. In some embodiments, the processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include any of a capacitive touchscreen, resistive touchscreen, any other touchscreen technology, a trackpad that is part of the computing system 1000 or attached as a peripheral, a set of touch sensitive buttons or touch sensitive keys that are used to provide inputs to the computing system 1000, or any other touch sensing hardware that detects multiple touches and that is coupled to the computing system 1000 or is attached as a peripheral. The input device 1030 also include alphanumeric keypads (including physical keyboards and touchscreen keyboards), pointing devices (also called "cursor control devices"). The input devices 1030 also include audio input devices (e.g., microphones, MIDI musical instruments, etc.). The output devices 1035 display images generated by the computer system. For instance, these devices display the KEI. The output devices include printers and display devices, such as cathode ray tubes (CRT) or liquid crystal displays (LCD).

Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet, or a network of networks, such as the internet. For example, the computer 1000 may be coupled to a web server (network 1065) so that a web browser executing on the computer 1000 can interact with the web server as a user interacts with a GUI that operates in the web browser.

As mentioned above, the computer system 1000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention.

We claim:

1. A computer-implemented method comprising:
   with at least one machine having a processor:
      aggregating a plurality of messages that are disseminated to a plurality of entities at any of a plurality of social media sites, wherein the plurality of messages comprise a first message that is disseminated to a first social media site of the plurality of social media sites and a second message that is disseminated to a second different social media site of the plurality of social media sites;
      identifying a particular entity that is referenced in body text of at least the first message and the second message by detecting an alphanumeric identifier of the particular entity in the body text of the first and second messages, wherein the body text of a message is separate from a header of the message that specifies a source of and a recipient for the message; and
      presenting at least the first and the second messages in one interface that is independent of interfaces of the first social media site and the second social media site to which the first and second messages are disseminated.

2. The computer-implemented method of claim 1 further comprising configuring a communication tool running on a plurality of user devices to disseminate the plurality of messages to said machine in addition to any of the plurality of social media sites that is specified as a destination.

3. The computer-implemented method of claim 1, wherein identifying the particular entity comprises comparing different fragments from body text of the plurality of messages against a list of alphanumeric identifiers identifying a plurality of entities and determining at least one fragment from the body text of the first and second messages that matches to an alphanumeric identifier for the particular entity.

4. The computer-implemented method of claim 1, wherein the alphanumeric identifier comprises at least one of an entity name, username, address, telephone number, and email address.

5. The computer-implemented method of claim 1 further comprising presenting in conjunction with the first and second messages, an identifier identifying each social media site to which each of the first and second messages is disseminated.

6. The computer-implemented method of claim 1 further comprising presenting in conjunction with the first and second messages, an identifier identifying each sender that originates and disseminates each of the first and second messages.

7. The computer-implemented method of claim 1 further comprising presenting in conjunction with the first and second messages, a score quantifying credibility of the particular entity.

8. The computer-implemented method of claim 7, wherein the score is derived in part from sentiment that is expressed in the body text of at least the first and second messages.

9. A non-transitory computer-readable storage medium of an information aggregation system with an executable program stored thereon, wherein the program instructs a processor of the information aggregation system to perform sets of instructions for:
    aggregating a plurality of messages that are disseminated to a plurality of entities at any of a plurality of social media sites, wherein the plurality of messages comprise a first message that is disseminated to a first social media site of the plurality of social media sites and a second message that is disseminated to a second different social media site of the plurality of social media sites;
    identifying a particular entity that is referenced in body text of at least the first message and the second message by detecting an alphanumeric identifier of the particular entity in the body text of the first and second messages, wherein the body text of a message is separate from a header of the message that specifies a source of and a recipient for the message; and
    presenting at least the first and the second messages in one interface that is independent of interfaces of the first social media site and the second social media site to which the first and second messages are disseminated.

10. The non-transitory computer-readable storage medium of claim 9, wherein the program further instructs the processor to perform a set of instructions for configuring a communication tool running on a plurality of user devices to disseminate the plurality of messages to said machine in addition to any of the plurality of social media sites that is specified as a destination.

11. The non-transitory computer-readable storage medium of claim 9, wherein identifying the particular entity comprises comparing different fragments from body text of the plurality of messages against a list of alphanumeric identifiers identifying a plurality of entities and determining at least one fragment from the body text of the first and second messages that matches to an alphanumeric identifier for the particular entity.

12. The non-transitory computer-readable storage medium of claim 9, wherein the alphanumeric identifier comprises at least one of an entity name, username, address, telephone number, and email address.

13. The non-transitory computer-readable storage medium of claim 9, wherein the program further instructs the processor to perform a set of instructions for presenting in conjunction with the first and second messages, an identifier identifying each social media site to which each of the first and second messages is disseminated.

14. The non-transitory computer-readable storage medium of claim 9, wherein the program further instructs the processor to perform a set of instructions for presenting in conjunction with the first and second messages, an identifier identifying each sender that originates and disseminates each of the first and second messages.

15. The non-transitory computer-readable storage medium of claim 9, wherein the program further instructs the processor to perform a set of instructions for presenting in conjunction with the first and second messages, a score quantifying credibility of the particular entity.

16. The non-transitory computer-readable storage medium of claim 15, wherein the program further instructs the processor to perform a set of instructions for deriving the score in part from sentiment that is expressed in the body text of at least the first and second messages.

17. The non-transitory computer-readable storage medium of claim 9, wherein the program further instructs the processor to perform a set of instructions for retrieving an advertisement that is relevant for the particular entity.

18. The non-transitory computer-readable storage medium of claim 17, wherein the program further instructs the processor to perform a set of instructions for passing said advertisement to a sender of the first message.

19. A computer system comprising:
    a memory storing computer-executable instructions; and
    a computer processor in communication with the memory, the computer-executable instructions programming the computer processor in:
        aggregating a plurality of messages that are disseminated to a plurality of entities at any of a plurality of social media sites, wherein the plurality of messages comprise a first message that is disseminated to a first social media site of the plurality of social media sites and a second message that is disseminated to a second different social media site of the plurality of social media sites;
        identifying a particular entity that is referenced in body text of at least the first message and the second message by detecting an alphanumeric identifier of the particular entity in the body text of the first and second messages, wherein the body text of a message is separate from a header of the message that specifies a source of and a recipient for the message; and
        presenting at least the first and the second messages in one interface that is independent of interfaces of the first social media site and the second social media site to which the first and second messages are disseminated.

* * * * *